(12) United States Patent
Matsumoto

(10) Patent No.: US 6,450,695 B1
(45) Date of Patent: Sep. 17, 2002

(54) OPTICAL CONNECTOR

(75) Inventor: Tateomo Matsumoto, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/481,973

(22) Filed: Jan. 13, 2000

(30) Foreign Application Priority Data

Jan. 28, 1999 (JP) .......................................... 11-020347

(51) Int. Cl.⁷ ................................................. G02B 6/38
(52) U.S. Cl. .............................. 385/60; 385/53; 385/52; 385/56
(58) Field of Search ............................. 385/52, 56, 60, 385/66, 40, 72, 73, 71

(56) References Cited

U.S. PATENT DOCUMENTS

| | | | | |
|---|---|---|---|---|
| 5,082,345 A | * | 1/1992 | Cammons et al. ............ | 385/60 |
| 5,208,886 A | * | 5/1993 | Clayton et al. ................ | 385/73 |
| 5,257,335 A | * | 10/1993 | Kurata et al. .................. | 385/78 |
| 5,267,342 A | * | 11/1993 | Takahashi et al. ........... | 385/140 |
| 5,706,379 A | * | 1/1998 | Serafini et al. ................ | 385/75 |
| 5,742,725 A | | 4/1998 | Longobardi et al. ......... | 385/140 |
| 6,048,102 A | * | 4/2000 | Fukushima ................... | 385/72 |
| 6,158,052 A1 | * | 2/2001 | Fujimori et al. ............. | 359/819 |
| 6,185,052 B1 | * | 2/2001 | Fujimori et al. ............. | 359/819 |

FOREIGN PATENT DOCUMENTS

| | | | | |
|---|---|---|---|---|
| EP | 0704 724 | 4/1996 | ................... | 385/70 |
| WO | WO 96 31795 | 10/1996 | ................. | 385/147 |

* cited by examiner

Primary Examiner—Brian Healy
Assistant Examiner—Scott Knauss
(74) Attorney, Agent, or Firm—Kanesaka & Takeuchi

(57) ABSTRACT

The optical connector comprising a housing (2), a first ferrule section (3) for holding an optical fiber having a damping or filtering function, a second ferrule section (3') for holding an ordinary optical fiber, and an aligning sleeve (5) for aligning the first and second ferrule sections (3, 3') for detachable abutment.

14 Claims, 3 Drawing Sheets

OPTICAL CONNECTOR

BACKGROUND OF THE INVENTION

1. Field of the Invention

The present invention relates to optical connectors and, particularly, to an optical connector capable of incorporating a damping or filtering element.

2. Description of the Related Art

In order to provide an optical connector with a damping or filtering function, it has been necessary to connect a separate damper or filter to the optical connector. The damper or filter is connected between the optical connector and an adapter, etc., to damp an optical signal or filter an optical signal of a predetermined frequency to the equipment.

However, these conventional systems increase the distance between the optical connector and the adapter, resulting in the large systems. In addition, in order to be connected to the optical connector, the damper or filter must have the same opening as that of the adapter for receiving the optical connector. Consequently, it must have a sufficiently thick wall to form such an opening so that it has been impossible to mount a plurality of optical connectors closer than the wall thickness. Consequently, the mount density that a plurality of optical connectors with a damper or filter are mounted has been low.

Since a separate damper or filter must be added, the number of components becomes larger than that of the ordinary optical connector. The ferrules or optical fibers of optical connectors are worn out by abutting against mating optical connectors, but it has been impossible to replace the worn ferrules or optical fibers because they are fixed to the optical connectors. As the optical connectors are made smaller, there has been a damned for an optical connector having higher mechanical strength and electromagnetic interference protection.

SUMMARY OF THE INVENTION

Accordingly, it is an object of the invention to provide an optical connector which is made compact by incorporating a damping or filtering element and is able to be mounted in a large number closely to each other, thereby increasing the mounting density. In addition, the addition of the damping or filtering function is made by not increasing very much the number of components. Moreover, it is still another object of the invention to provide an optical connector that the worn ferrule or optical fiber can be replaced. It is yet another object of the invention to provide an optical connector which has satisfactory mechanical strength and a housing jacket resistant against electromagnetic interference.

According to one aspect of the invention there is provided an optical connector comprising a housing; a first ferrule section for holding a first optical member; a second ferrule section for holding a second optical member; and an aligning member for detachably aligning said first and second ferrule sections within said housing.

According to an embodiment of the invention, the aligning member takes a form of sleeve.

According to another embodiment of the invention, at least one of said first and second optical members has a damping function.

According to still another embodiment of the invention, at least one of said first and second optical members has a filtering function.

According to yet another embodiment of the invention, at least one of said first and second optical members is an ordinary optical fiber.

According to another embodiment of the invention, said housing is detachable from said second ferrule section.

According to still another embodiment of the invention, wherein said housing is connected to said second ferrule section by means of a bayonet joint.

According to yet another embodiment of the invention, said housing is made by magnesium injection molding.

DESCRIPTION OF THE PREFERRED EMBODIMENTS

Figure 1:
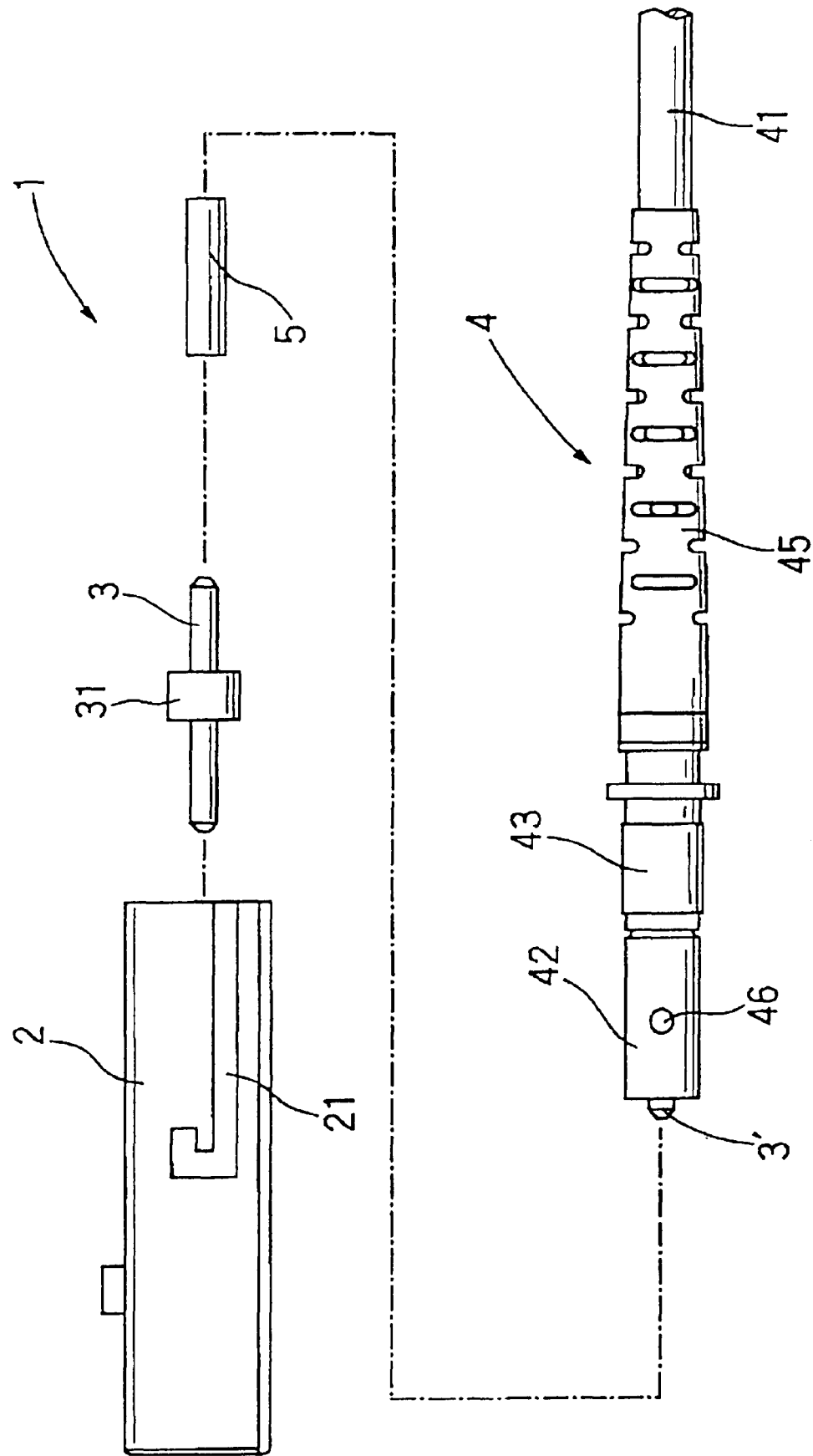
FIG. 1 is an exploded side elevational view of an optical connector according to an embodiment of the invention.
Figure 2:
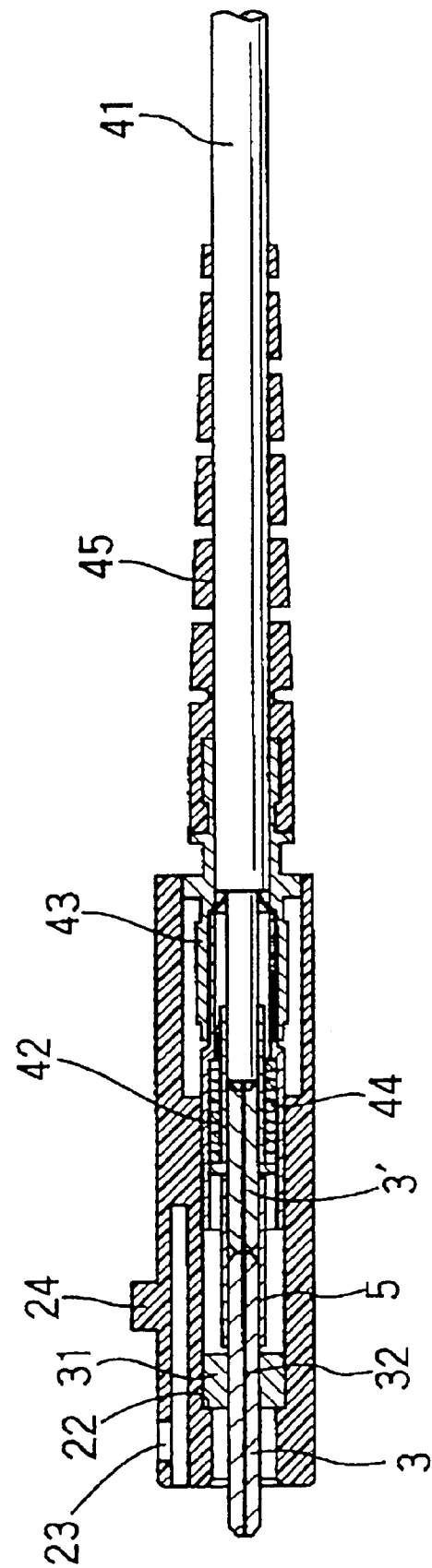
FIG. 2 is a longitudinal section of the optical connector after assembling.

In FIG. 1, the optical connector 1 comprises a housing 2, a first ferrule 3, and a body section 4. These three sections are made easy to assemble and disassemble to permit replacement of the first ferrule 3.

The body section 4 comprises a second ferrule section 3' cooperating with the first ferrule section 3 to form a ferrule and a aligning member or sleeve 5 for aligning the first and second ferrule sections 3 and 3' to form the ferrule. Alternatively, the aligning sleeve 5 may be replaced by the inner wall of the housing. Thus, the aligning member 5 is not limited to the sleeve.

The body member or section 4 further comprises an optical cable 41, a fixing metal 42 for fixing the optical cable 41, a crimping ring 43 for fixing the fixing metal 42 to the optical cable 41, a spring 44 provided within the fixing metal 42 to push the second ferrule section 3' and thus first ferrule section 3 toward the front tip of the optical connector, and a food 45 surrounding a front portion of the optical cable 41.

In order to permit replacement of the first ferrule section, the optical connector according to the invention is different from the conventional one in the following points:

(1) the ferrule is divided into the first and second ferrule sections 3 and 3';

(2) the aligning sleeve 5 is provided to align the first and second ferrule sections 3 and 3'; and (3) the housing 2 is detachable from the body member 4 having the second ferrule section 3' and is made by magnesium injection molding to provide not only mechanical strength but also protection from electromagnetic interference.

The number of components more than the conventional optical connector is only two; one ferrule section and one aligning sleeve. The appearance and size of the optical connector according to the invention are the same as the conventional optical connector wherein the ferrule is not divided. Consequently, the optical connector according to the invention can be connected to an adapter, etc., in the same way as the ordinary optical connector. Although there is provided an additional ferrule section, the optical connector according to the invention is not longer than the ordinary optical connector.

In essence, according to the invention, the ferrule is divided into the first and second ferrule sections to permit replacement of a portion of the ferrule. Alternatively, the ferrule may be divided into three or more sections.

The second ferrule section 3' is provided behind the first ferrule section 3. An optical fiber of the optical cable is held within the second ferrule section 3' which is integrally fixed to the other components to form the body member 4 so that it is impossible to remove the second ferrule section 3' from the optical connector. The aligning sleeve 5, however, may be separable.

The first ferrule section 3 is independent from and is not fixed to the other components. It is inserted into the aligning sleeve 5 and abutted against the second ferrule section 3'. Since it is not fixed but detachable, it is possible to replace it. A circular stopper 31 is provided at a middle of the first ferrule section 3 so as to abut against an inner flange 22 of the housing 2 to prevent the first ferrule section 3 from falling out of the housing 2.

The first ferrule section 3 holds an optical member 32 such as an optical fiber. The optical member 32 may be a damping or filtering fiber. Consequently, it is possible to attach a damping or filtering element or the first ferrule section 3 holding a damping or filtering fiber to the optical connector. For example, cobalt, a light absorbing dopant, may be doped into the optical fiber to provide a damping element. A grated fiber may be used to provide a filtering element. When the optical member 32 is an ordinary optical fiber, both of the ferrule sections 3 and 3' are used as ordinary ferrules.

As described above, by selecting the optical member 32, it is possible to use the first ferrule section 3 as a damping, filtering, or ordinary ferrule element. By simply replacing one of the first ferrule sections, it is possible to provide the optical connector having a damping, filtering, or ordinary element. It is easy to replace the worn-out first ferrule section.

Figure 3:
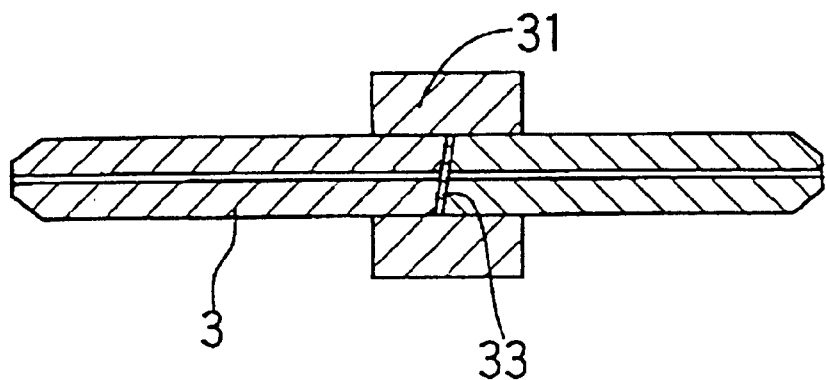
FIG. 3 is a longitudinal section of a first ferrule section according to another embodiment of the invention.

In FIG. 3, a metallic or dielectric multilayer film 33 is provided at a middle of an optical fiber within a first ferrule section 3 to form a damping or filtering element. The first and second ferrule sections 3 and 3', Hand the aligning sleeve 5 are accommodated in the housing 2 to prevent damage thereto. In order to permit replacement of the first ferrule section 3 within the housing 2, it is necessary for the housing 2 to be detachable from the second ferrule section 3' and the other components constituting the body member 4. The detachable methods include bayonet joint such as shown in FIG. 1, screw connection, push-pull lock, etc.

As shown in FIG. 1, the bayonet joint is formed by providing a projection 46 on a component of the body member 4 or on the fixing metal and a J-shaped groove 21 in the housing. The housing 2 is attached to the body member 4 of the optical connector 1 by inserting the projection 46 into the J-shaped groove 21 and moving the housing 2 forwardly and turning it to the predetermined direction. It is removed from the body member 4 of the optical connector 1 by doing the above operation in the reversed order.

The housing 2 is made by magnesium injection molding or thixomolding. The thixomolding is a magnesium alloy molding technique wherein material chips are put in a molding machine and melt under heat in the cylinder and injected into a metal mold. The optical connector equipped with such a housing 2 is smaller, lighter, and stronger than the conventional one. Also, the electromagnetic interference by the adapter is reduced.

Figure 4:
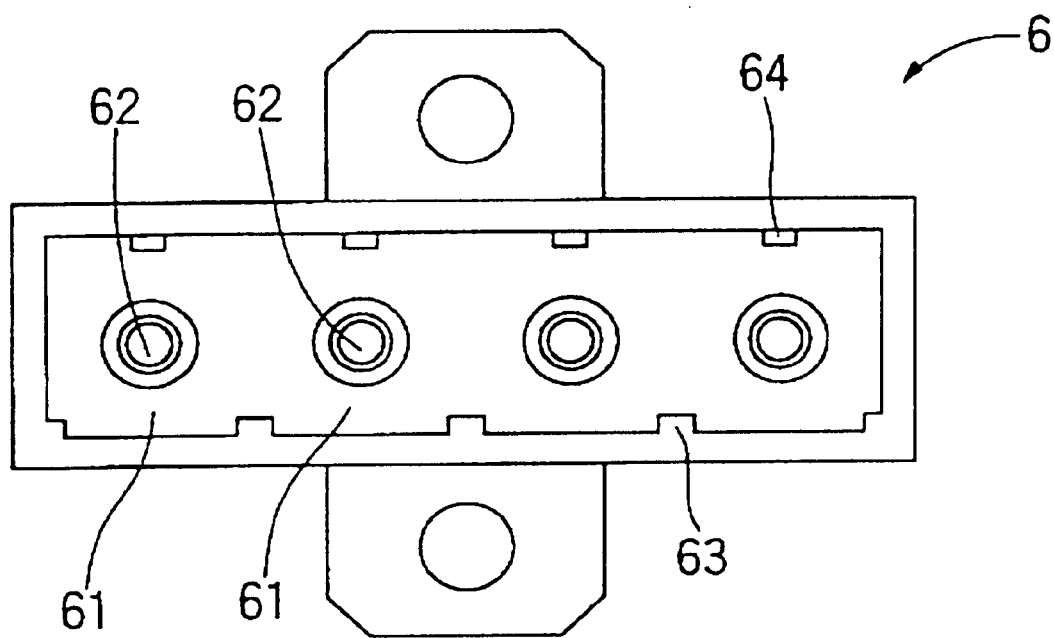
FIG. 4 is a front elevational view of a high-density mounting adapter.

As has been described above, the optical connector according to the invention has a damping or filtering function so that no additional damping or filtering element is required but it is possible to mount a plurality of optical connectors very closely in contact with the adapter. That is, a high-density adapter is usable as shown in FIG. 4, wherein the adapter 6 has four openings 61 for receiving the housings 2 of optical connectors. A hole 62 is provided in each of the openings 61 to receive the first ferrule section projecting from the housing 2. The housing 2 is directed by a guide 63 so that the engaging hole 23 engages with the engaging projection 64 for lock. To remove, the operation section 24 is pushed for releasing the lock. It should be noted that there is no wall between the openings 61. Consequently, it is possible to mount a plurality of optical connectors very closely, thus providing high-density mounting. According to the invention, it is possible to use such a high-density mounting adapter in addition to the damping or filtering function.

Alternatively, the ordinary optical fiber of the second ferrule section 3' may by replaced by an optical member having a damping or filtering function so that the second ferrule section 3' functions as a damping or filtering element. Both of the first and second ferrule sections 3 and 3' may have optical members other than ordinary optical fibers.

According to the invention there is provided a compact optical connector enabling to provide high density mounting. Despite the damping or filtering function, the optical connector has a considerably smaller number of components. Also, it has a housing which has mechanical strength and resistance against electromechanical interference.

What is claimed is:

1. An optical connector comprising:

a housing;

a first ferrule section for holding a first optical member;

a second ferrule section for holding a second optical member, said second ferrule section being constantly in contact with said first ferrule section; and aligning means for detachably aligning said first and second ferrule sections within said housing, wherein said first optical member has a damping function to damp an optical signal or a filtering function to filter said optical signal of a predetermined frequency by changing said first ferrule section, which is detachable from said housing and second ferrule section for easy replacement, and projects from said housing so as to be connected to an adapter in the same way as an ordinary optical connector.

2. An optical connector according to claim 1, wherein said housing is detachable from said second ferrule section by means of a bayonet joint.

3. An optical connector according to claim 1 or 2, wherein said housing is made by magnesium injection molding.

4. An optical connector assembly, comprising:

a plurality of optical connectors according to claims 1 or 2; and an adapter having:
  a plurality of openings for receiving said housings of said optical connectors; and
  a plurality of holes, each provided in each one of said openings for receiving said first ferrule, wherein said openings are not partitioned by walls.

5. An optical connector assembly, comprising:

a plurality of optical connectors according to claim 3; and an adapter having:
  a plurality of openings for receiving said housings of said optical connectors; and
  a plurality of holes, each provided in each one of said openings for receiving said first ferrule, wherein said openings are not partitioned by walls.

6. An optical connector according to claim 1, wherein said second optical member has said damping or filtering function.

7. An optical connector according to claim 1, wherein a light absorbing dopant is doped into said first optical member to provide said damping function.

8. An optical connector according to claim 1, wherein a metallic film is provided within said first ferrule section to provide said damping function.

9. An optical connector according to claim 1, wherein said first optical member is made of a grated fiber to provide said filtering function.

10. An optical connector according to claim 1, wherein a dielectric multilayer film is provided within said first ferrule section to provide said filtering function.

11. An optical connector according to claim 6, wherein a light absorbing dopant is doped into said second optical member to provide said damping function.

12. An optical connector according to claim 6, wherein a metallic film is provided within said second ferrule section to provide said damping function.

13. An optical connector according to claim 6, wherein said second optical member is made of a grated fiber to provide said filtering function.

14. An optical connector according to claim 6, wherein a dielectric multilayer film is provided within said second ferrule section to provide said filtering function.

* * * * *